Patented July 10, 1951

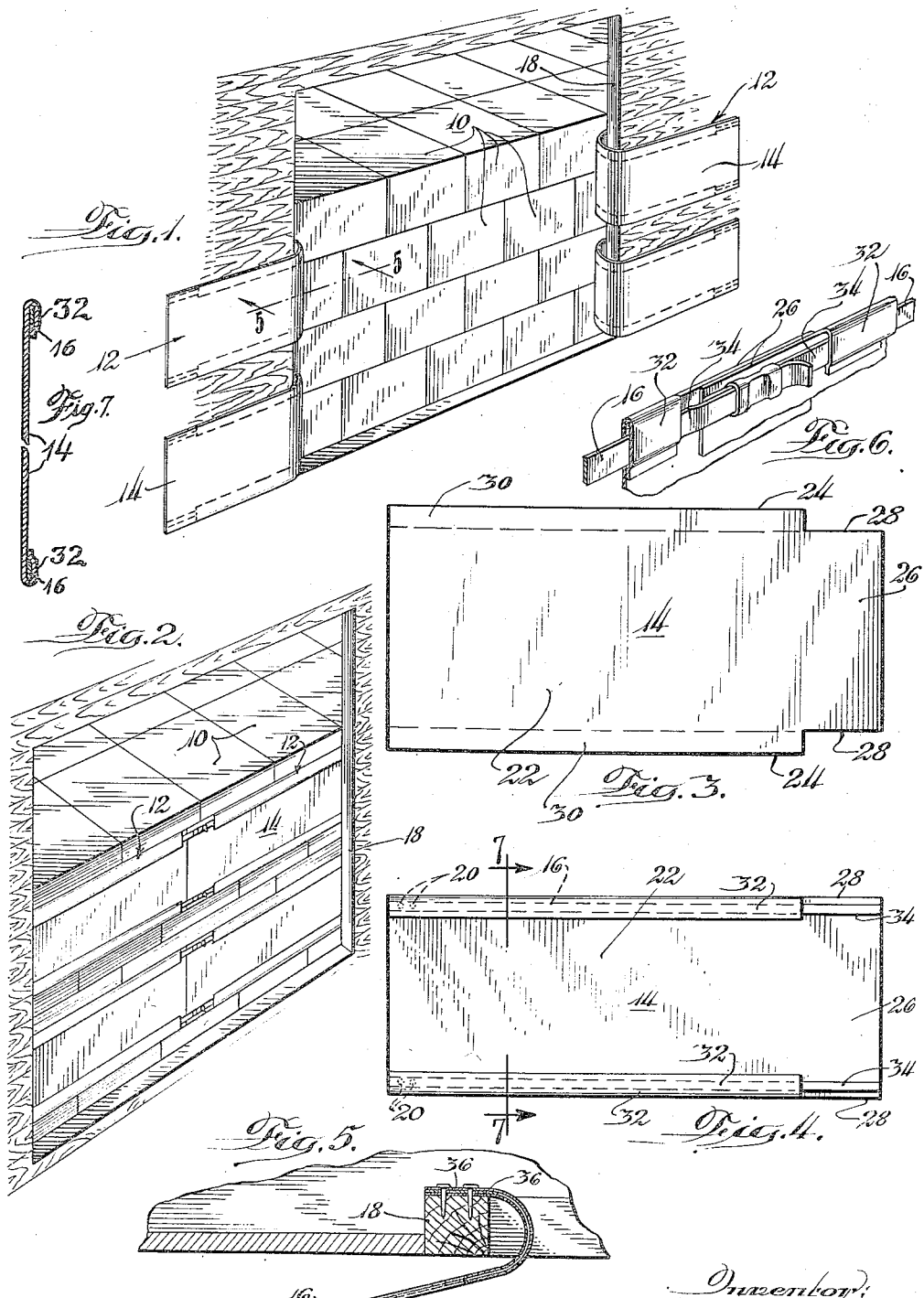

2,559,783

UNITED STATES PATENT OFFICE 2,559,783

LOAD RETAINING STRIP

John M. Moon, Evanston, Ill., assignor to Signode Steel Strapping Company, Chicago, Ill., a corporation of Delaware Application July 16, 1948, Serial No. 39,020

8 Claims. (Cl. 105—369)

The present invention relates to a load retaining bulkhead strip of prefabricated construction adapted to be disposed transversely of the doorway of a freight car or like vehicle between the load and the door for preventing shifting of the load into the doorway.

Retaining strips are in common use in the loading of freight cars with commodities shipped in bags, cartons or boxes or other light and relatively fragile merchandise packages to prevent jamming of the load against the car door during transit. These retaining strips are anchored to the inner side of the car adjacent the opposite edges of the doorway and heretofore they have consisted of a single unitary strip long enough to bridge the doorway transversely with a sufficient overlap so that the opposite ends of the strip could be secured to the opposite edges of the doorway. Because they are secured to the inner side of the doorway, it has been necessary to fasten the strips in place before loading was commenced or at the latest before moving in that portion of the load which was to be stored opposite the doorway. As a result, it was necessary, in loading the car, to lift the boxes or other containers over the strip, thus increasing the labor of the loading crews.

Accordingly, one object of the invention is to provide a prefabricated load retaining bulkhead strip adapted to be disposed transversely of the doorway of a freight car or like vehicle to prevent jamming of the load against the door, which bulkhead strip may be installed prior to loading, but nevertheless presents no interference to the movement of the load through the doorway of the car during the loading operation.

Another object of the invention is to provide an improved load retaining bulkhead strip of the strap reinforced paper or fabric type for the doorway of a freight car or like vehicle, which is prefabricated and may be manufactured economically so that it may be discarded after one use.

A further object of the invention is the provision of a new and improved load retaining bulkhead strip for the doorway of a freight car or like vehicle which may be easily anchored to the doorway before loading and readily tensioned after loading to prevent movement of the load or any constituents thereof during switching or transit of the car.

Other objects, advantages and capabilities of the invention will appear hereinafter in the explanation of the single embodiment of the invention illustrated in the accompanying drawings, wherein:

Fig. 1 is a fragmentary perspective view of a freight car showing a typical load of rectangular packing containers in place therein and the improved load retaining bulkhead strip of the present invention folded back along the outer sides of the car in the position assumed during loading of the car;

Fig. 2 is a fragmentary perspective view similar to Fig. 1 but with the free ends of the retaining strips brought together, tensioned, and secured to each other to prevent movement of the load into the doorway;

Fig. 3 is a plan view of a paper or other fabric blank forming part of the bulkhead strip of the present invention;

Fig. 4 is a plan view of one of the two half strips or units;

Fig. 5 is a transverse sectional view of the door frame of a freight car taken on the line 5—5 of Fig. 1 showing the manner in which the fixed ends of the half strips are anchored to the car;

Fig. 6 is a fragmentary perspective view of the overlapping free ends of the half strips in the position they asume when the ends are secured to each other; and Fig. 7 is a vertical transverse sectional view of the device which may be considered as taken substantially along the line 7—7 of Fig. 4.

A typical freight car load is shown in Figs. 1 and 2 consisting of a plurality of rectangular boxes or cartons 10 stacked to a uniform height and extending across the space in the car between the opposite doorways therein. In the absence of some means for preventing shifting of a load of this type during switching and transit of the car it quite frequently happens that the load moves far enough laterally to become jammed against one or both doors of the car so that it is difficult to open them at the destination. My improved load retaining bulkhead strip for preventing such movement of the load is shown in operative position in Fig. 2, while in Fig. 1 it is shown in loading position. As indicated in Figs. 1 and 2, more than one strip may be used, the separate strips being disposed in vertical spaced relation where the height of the load makes this necessary or desirable.

Referring to Figs. 1 and 2, it will be seen that each complete load retaining bulkhead strip comprises two separate half strips or units 12 which may be identical so that manufacture is simplified and cost reduced. Each of these half strips comprises a flexible sheet or panel 14 of paper or other fabric of the desired strength and character and a pair of flexible metallic reinforcing straps or tension members 16 which may be anchored at one end to a part of the car structure such as a side frame member 18 of the doorway (Fig. 5). One of these half strips 12 is anchored adjacent each of the opposite vertical edges of the doorway at the inside of the car and the half strips are of sufficient length to bridge the doorway transversely as indicated in Fig. 2 when they are arranged in aligned end to end relation with a sufficient surplus in length to provide for overlapping of the free ends thereof in the central region of the doorway. These free ends of the half strips are secured together by tensioning the overlapping reinforcing strap ends and securing the same to each other by a sealed joint.

For the greatest all around adaptability to use on various types of loads and from the standpoint of low cost and strength, the panels 14, where a single ply is to be used to form the panel, are preferably made from a good grade of kraft paper having a basis weight of 100 lbs. and a thickness of approximately 0.009 inch. This paper has a tensile strength of approximately 80 lbs. per inch longitudinally and 40 lbs. per inch transversely. Good results are obtained with reinforcing straps or tension members 16 of cold rolled steel 3/4 inch by 0.020 inch. These straps may be provided with at least two closely spaced perforations 20 adjacent one end of a size to accommodate ordinary sixpenny nails for anchoring these ends of the straps to the vertical door posts or side walls of the car, as best seen in Fig. 5, or the strap may be perforated throughout its length with relatively closely spaced apertures. Retaining strips made with the latter type of strap are more readily accommodated to various doorway constructions because they allow greater latitude in nail placement.

Bulkhead strips made from materials having the foregoing specifications have been found to be adaptable for use with a wide range of load types but it is to be understood that for some commodities or due to special conditions or places of use other materials and specifications may be more suitable.

Referring to Figs. 3 and 4, it will be seen that the panel 14 is formed from a single ply of paper and that it is cut to provide an elongated main body portion 22 having longitudinally extending edges 24 and a relatively short integral extension or apron 26 on one end thereof which has opposite edges 28 parallel with the longitudinally extending edges 24 on the main body portion, but both transversely set back from these latter edges. The marginal portion of the longitudinally extending edges 24 of the main body portion in excess of the transverse width of the extension between the edges 28 is lapped or folded over along a line parallel with the edges 28 of the extension, as shown in Figs. 4 and 6 to form flaps 30. These flaps are secured along their marginal edges to the main body of the panel by means of a suitable adhesive, such as the material commonly known as "water glass" or any other suitable low cost adhesive. The adhered flaps thus form pockets on the longitudinally extending marginal edges of the main body portion of the panel as indicated at 32 in Fig. 4 which are coextensive with the main body portion 22, so that they fall short of the total length of the panel by the length of the extension 26.

Each of the reinforcing tension members or straps 16 should conform in length to the total end to end length of the panel 14 including the extension 26 and the two straps 16 for each half strip or unit are secured to the panel by enclosing a strap in each pocket 32 on the panel with the straps disposed in coextensive end to end relation to the half strip. In order to prevent endwise displacement of the straps, the adhesive used to secure the marginal edge of the flaps 30 to the body of the panel to form the pockets 32 is applied to the confronting surfaces of the pockets and straps. Since the straps and panels are of the same length and are coextensively arranged in end to end relation while the marginal pockets 32 terminate at the apron extension 26, it will be apparent that a portion of each strap will project from its enclosing pocket in exposed overlying relation to the extension, as indicated at 34 in Fig. 4. This projecting portion of the straps may be left free of attachment to the panel or it may be secured to the extension 26 by means of the adhesive previously mentioned. In the latter case the extension is easily separated from the projecting ends 34 of the straps because the adhesive does not form a strong bond between steel and paper although the adhesion between the confronting surfaces of the pockets 32 and the portions of the straps enclosed thereby is effective to the degree necessary to prevent endwise displacement of the straps.

In the fabrication of the half strips or units, the panels 14 may be automatically cut to the proper length and form from a continuous length of paper of the proper width and specifications. Because the width of freight car doorways is more or less standardized, it has been found that the panels for the two half strips or units designed for use across such a doorway need be no more than 45 inches in total length including the extension 26 which preferably is approximately 7 inches long in a direction longitudinally of the panel and 18 inches wide in a direction transversely of the panel. The main body of the panel is approximately 22 inches wide to provide 2 inches on each of its longitudinally extending margins forming the flaps 30 out of which the pockets 32 are formed. After the adhesive has been applied the two straps 16 may be laid in the desired position, i. e., aligned with the longitudinally extending edges 24 of the panel and with the perforated ends thereof lying opposite the apron extension 26. The flaps 30 on each edge of the panel are then folded over the straps, preferably along a line in alignment with the opposite edges 28 of the extension, and the marginal edges of these flaps are pressed firmly against the body of the panel to unite the same thereto. This completes the fabrication of a single half unit or strip.

It will thus be apparent that I have provided an improved load retaining bulkhead strip which is of prefabricated construction so that it may be packed, stored, shipped, or installed as a unit by workmen of little skill. In installing my improved retaining strip, that end of one of the two half strips at which the perforated ends of the straps are located, i. e., that end which lies opposite the end upon which the extension 26 is formed, is first placed against the inside of the door frame of the car with the exposed ends of the straps 16 facing outwardly and with the lower edge of the half strip located somewhat above the level of the floor, the distance between the floor and the lower edge depending somewhat on the character of the load. This end is then anchored to the car structure by driving nails through the perforations 20 in the ends of the straps 16 and into the door post or side walls of the car, these nails being indicated at 36 in Fig. 5. The free end of this half strip is then folded back along the outer side walls of the car, as indicated in Fig. 1, and attached thereto by any suitable temporary means such as tacks. The other half strip is secured to the opposite edge of the doorway in the same manner as the first in horizontal alignment therewith and its free end is folded back and attached to the outer side walls of the car. If the height to which the car is to be loaded makes it advisable to use two retaining strips, the half units of the second strip are secured in the same manner as those of the first strip sufficiently above the first so that the contiguous upper and lower edges of the first and second strips will be spaced from each other an amount which will vary with the character of the load. However, in certain cases as in some types of bags loads it may be desirable to overlap the retaining strips so that strap re-inforcement for the panel is provided at less than 18 inch intervals.

After the car has been loaded, the free ends of the two half strips are released and brought together, and if the extensions 26 are adhered to the exposed portions 34 of the straps they are separated therefrom. The extensions 26 are then arranged in overlapped relation between the load and the exposed free ends 34 of the upper and lower straps, as best seen in Figs. 2 and 6. The free ends of these straps are then overlapped, subjected to the desired tension by an appropriate tensioning tool, and then secured together by a suitable seal joint.

One advantage of the construction described above arises from the fact that the overlapped extensions 26 protect the load from being damaged by the tools used by the workmen in tensioning and sealing the strap ends 34 and from any roughness at the joints between the straps.

Installation of my improved retaining strip is facilitated due to the fact that the two half units are prefabricated and each forms a complete unit with nail holes 20 located for proper anchoring of the strips so that little skill is required of the workmen in installing the same. Furthermore, manufacture of the half units or strips may easily be standardized so that they can be made at relatively low cost and thus may be discarded after one use. Because the straps 16 are tensioned and relatively closely spaced, they resist most of the thrust of the load. However, the fabric panels 14 tend to protect the load from damage by the straps and are sufficiently sturdy to prevent the corners or ends of bags or small containers from working in between the straps.

Retaining strips constructed according to the specifications mentioned herein are admirably suitable for installation across the doorways of freight cars loaded with such commodities as flour, sugar, meal, cement, fertilizer, salt or the like, contained in cloth or paper bags; canned goods, bottled goods or the like packed in fiber or wood containers or cartons, or other relatively light and fragile merchandise containers.

Having thus illustrated and described an embodiment of my invention, what I claim and desire to secure by United States Letters Patent is as follows:

1. A prefabricated load retaining bulkhead strip for the doorway of a freight car or like vehicle comprising an elongated panel of flexible sheet material having a main body portion and a short apron extension on one end of the main body portion, said panel being of double ply along at least the longitudinally extending marginal portions of the main body portion, and a flexible tension member fixed between said plies adjacent each longitudinally extending marginal edge of the panel, each of said tension members having one end exposed and being adapted to be anchored at their opposite ends to said car adjacent one edge of said doorway for fixedly securing said bulkhead strip in position, said exposed ends of the tension members being free of permanent attachment to said panel.

2. A prefabricated load retaining strip for the doorway of a freight car or like vehicle comprising a panel of tough, flexible fabric material including a main body portion of elongated dimensions horizontally having an integral relatively smaller apron extension on one end thereof, and a flexible metallic reinforcing strap having a greater resistance to stretching than said fabric material affixed to each horizontal edge of the main body of the panel in substantially coextensive end to end relation with the panel, the ends of said straps opposite said extension being adapted to be fastened to said car structure adjacent one edge of said doorway for fixedly positioning said panels vertically of the doorway, and the ends along said extension being free of permanent attachment to said panel.

3. A prefabricated load retaining bulkhead strip for the doorway of a freight car or like vehicle comprising a pair of spaced flexible tension members, a panel of flexible sheet material having a main body portion of substantial length the opposite longitudinal marginal edges of which are folded over separate tension members and secured thereto, the panel also including a relatively short portion of width substantially equal to the distance between the outer marginal edgs of said tension members, said tension members including an end portion exposed and overlying the last mentioned portion of said panel and an opposite end adapted to be anchored to said car adjacent one edge of said doorway, said exposed ends of said tension members being free of permanent attachment to said panel to facilitate tensioning and anchoring of said tension members, said portion of the panel underlying said free ends protecting the load from damage during the foregoing operations.

4. A load retaining strip adapted to be disposed across the doorway of a freight car or like vehicle between the load in the car and the door comprising a panel of tough, flexible sheet material having opposite edges folded over and adhered to the body of said panel to form pockets extending over the major portion of the total length of said panel from one end thereof and a relatively short extension on the other end of said panel of substantially the same dimensions transversely as the normal distance between the outer marginal edges of said pockets, and a flexible tension member in each of said pockets, each of said tension members having one end exposed along and overlying said extension and an opposite end adapted to be secured to said car adjacent one edge of said doorway for holding said panel in position, said ends of said tension members overlying said extension being free of permanent attachment thereto.

5. A load retaining bulkhead adapted to be disposed across the doorway of a freight car or like vehicle for preventing escape of the load, comprising a pair of generally similar prefabricated half strips each including a panel of flexible fabric material of double-ply along at least the longitudinally extending marginal portions of the panel over the major portion of the length of the same, said half strips being of sufficient length at least to bridge said doorway when they are disposed in aligned relation across the latter, and a flexible tension member fixed between the plies adjacent opposite marginal portions of each panel, a portion of one end of each of said tension members being exposed beyond the double-ply portion of the panel, the oppostie ends of the tension members in one of the half-strips being adapted to be anchored to the car adjacent one edge of said doorway with the tension member facing outwardly and the corresponding ends of the tension members in the other half strip being adapted to be anchored to the car adjacent the opposite edges of the doorway in a similar manner for fixedly positioning said half strips in aligned relation, said exposed ends of corresponding tension members in said half strips being adapted to be overlapped, tensioned, and sealed after a load is in position for permanently securing together the two half strips.

6. A load retaining bulkhead adapted to be disposed across the doorway of a freight car or like vehicle for preventing escape of the load, comprising a pair of substantially duplicate half strips, each of said half strips including a panel of flexible fabric material having an elongated main body portion and a relatively short integral extension on one end thereof of smaller dimensions between the edges thereof lying parallel with the longitudinal edges of said main body portion, said half strips being of sufficient length together to bridge said doorway and to overlap at least along said extensions when said half strips are disposed in aligned relation across said doorway, an integral pocket on each of the longitudinally extending edges of the main body portion formed by folding over the marginal part of each of the said edges which is in excess of the width of said extension and affixing the same to the main body of the panel, and a flexible tension member in each of said pockets, each of said members having one end exposed in overlying relation to said extension, the opposite ends of the tension members in one of the half strips being adapted to be anchored to the car adjacent one edge of said doorway with the exposed ends of said tension members facing outwardly, and the corresponding ends of the tension members in the other half strip being adapted to be anchored in like manner to the car adjacent the opposite edge of the doorway for fixedly positioning said half strips in aligned relation, said exposed ends of the tension members in said half strips being adapted to be overlapped along the overlapped extensions of said panels to facilitate tensioning and sealing of said tension members.

7. A load-retaining bulkhead for the doorway of a freight car or like vehicle, comprising duplicate prefabricated half strips, each of said half strips including a panel of flexible fabric material somewhat greater in length than half the distance between opposite edges of said doorway and a flexible metallic reinforcing strap having a greater resistance to stretching than said panel and of substantially the same length as the length of said panel affixed to each longitudinal edge of the panel in substantially coextensive end-to-end relation therewith, one end of the straps in one of the half strips being adapted to be fastened to the car structure adjacent one side of said doorway and the corresponding ends of the straps in the other half strip being adapted to be fastened to the car structure adjacent the opposite side of said doorway for fixedly positioning said half strips in aligned relation, the free ends of said straps being free of permanent attachment to said panels for a portion of their length adapting said free ends of the straps in the two half strips to be overlapped, tensioned, and sealed with the free ends of said panels disposed in overlapping relation to each other between said straps and the load in said car.

8. A load retaining strip for freight car doorways or the like comprising a pair of vertically spaced parallel flexible tension members secured to said doorway at one side thereof, a pair of similarly spaced tension members secured to the opposite side of said doorway in alignment with the first said tension members, a panel of flexible sheet material extending between and secured to said first pair, a similar panel secured to said second pair, said panels overlapping at the center of said doorway, and said aligned tension members overlapping at the center of said doorway, said overlapped tension members being secured together by joints with said joints lying outwardly of the overlapped panel portions.

JOHN M. MOON.

REFERENCES CITED

The following references are of record in the file of this patent:

UNITED STATES PATENTS

| Number | Name | Date |
|---|---|---|
| 2,226,373 | Frear | Dec. 24, 1940 |
| 2,414,160 | Moon | Jan. 14, 1947 |